(12) United States Patent
Veneruso

(10) Patent No.: US 7,149,339 B2
(45) Date of Patent: Dec. 12, 2006

(54) NON-DESTRUCTIVE INSPECTION OF DOWNHOLE EQUIPMENT

(75) Inventor: Anthony Frank Veneruso, Missouri City, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 755 days.

(21) Appl. No.: 10/374,947

(22) Filed: Feb. 25, 2003

(65) Prior Publication Data

US 2004/0165760 A1 Aug. 26, 2004

(51) Int. Cl.
*G06K 9/00* (2006.01)
*G06K 9/64* (2006.01)

(52) U.S. Cl. ...................... 382/141; 382/217
(58) Field of Classification Search ........... 382/112, 382/141, 149, 218, 305, 217; 378/4
See application file for complete search history.

(56) References Cited

U.S. PATENT DOCUMENTS

| | | | |
|---|---|---|---|
| 4,350,942 A | 9/1982 | Heisner et al. | |
| 4,600,998 A | 7/1986 | Huet | |
| 4,725,963 A | 2/1988 | Taylor et al. | |
| 4,729,128 A * | 3/1988 | Grimes et al. ............... | 382/116 |
| 5,088,557 A * | 2/1992 | Ricles et al. ................ | 166/297 |
| 5,090,039 A | 2/1992 | Gard et al. | |
| 5,848,118 A | 12/1998 | Goukassian | |
| 5,960,104 A | 9/1999 | Conners et al. | |
| 6,041,132 A | 3/2000 | Isaacs et al. | |
| 6,341,153 B1 * | 1/2002 | Rivera et al. .................. | 378/4 |
| 6,355,928 B1 | 3/2002 | Skinner et al. | |
| 6,449,334 B1 | 9/2002 | Mazess et al. | |
| 6,459,760 B1 | 10/2002 | D'Ambrosio | |
| 6,868,175 B1 * | 3/2005 | Yamamoto et al. ......... | 382/145 |

FOREIGN PATENT DOCUMENTS

| | | |
|---|---|---|
| EP | 0234537 A2 | 9/1987 |
| EP | 0471096 A1 | 11/1995 |
| WO | WO 00/25268 | 5/2000 |

OTHER PUBLICATIONS

Oster (Computed tomograpy as non-destructive test method for fiber main rotor blades in development, seris and maintenance. DGZfp-Proceedings BB 67-CD, pp. 19-29, 1999.*
Stanley (An Overview of the Nondestructive Inspection Techniques for Coiled Tubing and Pipe), American society for nondestructive testing, pp. 1-12, 1996.*

* cited by examiner

*Primary Examiner*—Daniel Mariam
(74) *Attorney, Agent, or Firm*—Van Someren, PC; Kevin P. McEnaney; Jaime A. Castano

(57) ABSTRACT

The present invention provides non-destructive computed tomography (CT) methods of testing downhole equipment. The non-destructive CT methods enable both extrinsic and intrinsic testing to ensure the quality of downhole components in elements such as downhole packers.

48 Claims, 8 Drawing Sheets

NON-DESTRUCTIVE INSPECTION OF DOWNHOLE EQUIPMENT

FIELD OF THE INVENTION

The present invention relates generally to non-destructive testing of downhole equipment. More particularly, the present invention provides non-destructive testing methods used to ensure the quality of downhole components such as sealing elements in downhole packers.

BACKGROUND OF THE INVENTION

Downhole equipment such as packers are essential components in the suite of well completion equipment required for production or injection wells. Unfortunately, defects within the packer's sealing element can cause failure of the packer with catastrophic consequences for the well's safe operation or its productivity. To date, conventional non-destructive inspection techniques have been applied in an attempt to discover such defects.

Conventional non-destructive inspection has consisted of techniques such as visual inspection, ultrasonic inspection, Laser, holographic and other optical methods, mechanical test methods and combinations of these methods, such as those used in automobile or airplane tire safety inspection. Each of these methods has severe drawbacks. For example, visual inspection does not reveal defects below the surface. Likewise, ultrasonic inspection does not provide sufficient spatial resolution required to observe the defect in detail. Additionally, with regard to ultrasonic inspection, rubber compounds, elastomeric and composite materials are well known acoustic absorbers thereby limiting the depth of ultrasonic wave penetration.

There exists, therefore, a need for non-destructive inspection techniques that enable detection of internal and external defects in downhole components such as packers. Such defects include de-laminations, de-bonds, and other defects in materials such as rubbers, elastomers, fiber reinforced composites, graphite composites, fiberglass, metal, and rubber/metal parts.

DETAILED DESCRIPTION OF PREFERRED EMBODIMENTS

The present invention provides non-destructive computed tomography (CT) testing methods useful to ensure quality control over downhole components such as packers. CT systems are well known in the art for medical diagnostic instrumentation and for inspecting large objects such as gas turbine engine components. CT systems typically include a source of radiation and associated detectors. The source provides a beam of penetrating radiation (X-ray of neutron ray) that is projected through an object at selected locations, and is intercepted by the associated detectors that count the photon interaction between the radiation and the object matter. The scan data-provided by the CT is used for purposes of reconstructing a cross-sectional area or slice through the object at a selected location on the object. One such CT system is described in U.S. Pat. No. 5,119,408 and is incorporated herein by reference.

In contrast to conventional X-rays or radioscopy, CT systems provide non-destructive 2D or 3D views of internal structures or defects. CT systems enable a full scan to be made of a finished part or a complete assembly. Because the technique is based on X-rays or neutron rays, the 2D or 3D images visualize complete assemblies made of any material such as rubbers, elastomers, fiber reinforced composites, graphite composites, fiberglass, ceramics, polymers, metal, and rubber/metal parts.

Figure 1:
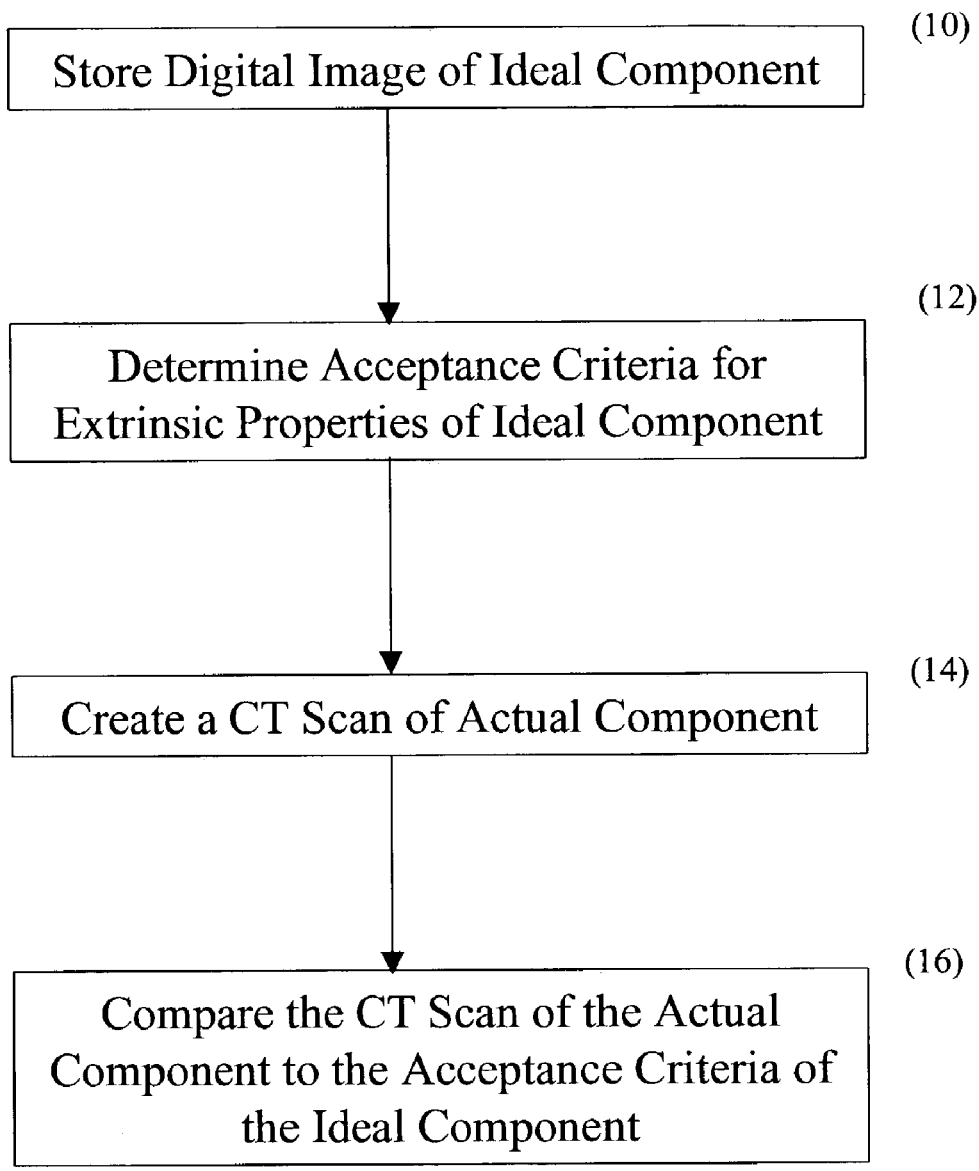
FIG. 1 illustrates an embodiment of the present invention providing a non-destructive computed tomography (CT) method of detecting extrinsic defects in downhole equipment.

Referring to FIG. 1, an embodiment of the present invention provides a non-destructive CT method (1) of detecting extrinsic defects in downhole equipment such as packers. In this embodiment, the method (1) can be used to detect extrinsic defects such as de-bonds or geometric irregularities in a single component such as a sealing element. Similarly, the method of this embodiment can be used to detect irregularities in the interfaces of multiple components within the piece of equipment being inspected.

In this embodiment, a digital image of one or more ideal downhole components is first created (10). The digital image of the ideal downhole components can be in the form of a computer aided design (CAD) file incorporating the design specifications, or can be created experimentally from calibration samples, called phantoms, that are made under controlled conditions using materials and processes that accurately represent the final desired component specifications.

After the digital image of the one or more ideal downhole components is created (10), acceptance criteria for one or more extrinsic properties of the one or more ideal components is determined (12). As discussed above, the extrinsic properties can include de-bonds, geometric irregularities, and interface irregularities. Acceptance criteria in the way of tolerances are determined for the properties of interest. For example, if inspecting a sealing element of a packer, acceptable tolerances may be determined for both the inner and outer diameter of the element. Likewise, if inspecting the interface between the sealing element and the lower mandrel, acceptable tolerances for the geometric boundary between the two elements will be determined.

After the acceptance criteria are determined (12), a CT scan is performed to create a digital image of one or more actual downhole components (14). The CT scan is performed using a conventional CT scanner as described above.

Finally, the digital image of the one or more actual downhole components is compared to the acceptance criteria that was determined for the one or more ideal downhole components (16). The comparison is performed by techniques known in the art such as simple edge detection algorithms that enable the dimensional properties to be analyzed to within several thousandths of an inch.

The present invention also provides non-destructive CT methods of measuring intrinsic defects in downhole equipment. Intrinsic defects such as de-laminations, voids and other density irregularities can be detected in downhole components manufactured from materials such as rubber, elastomers, fiber reinforced composites, fiberglass, metal, polymers, and ceramics. The non-destructive CT methods of measuring intrinsic defects are based on voids and local densities of the components inspected.

Figure 2:
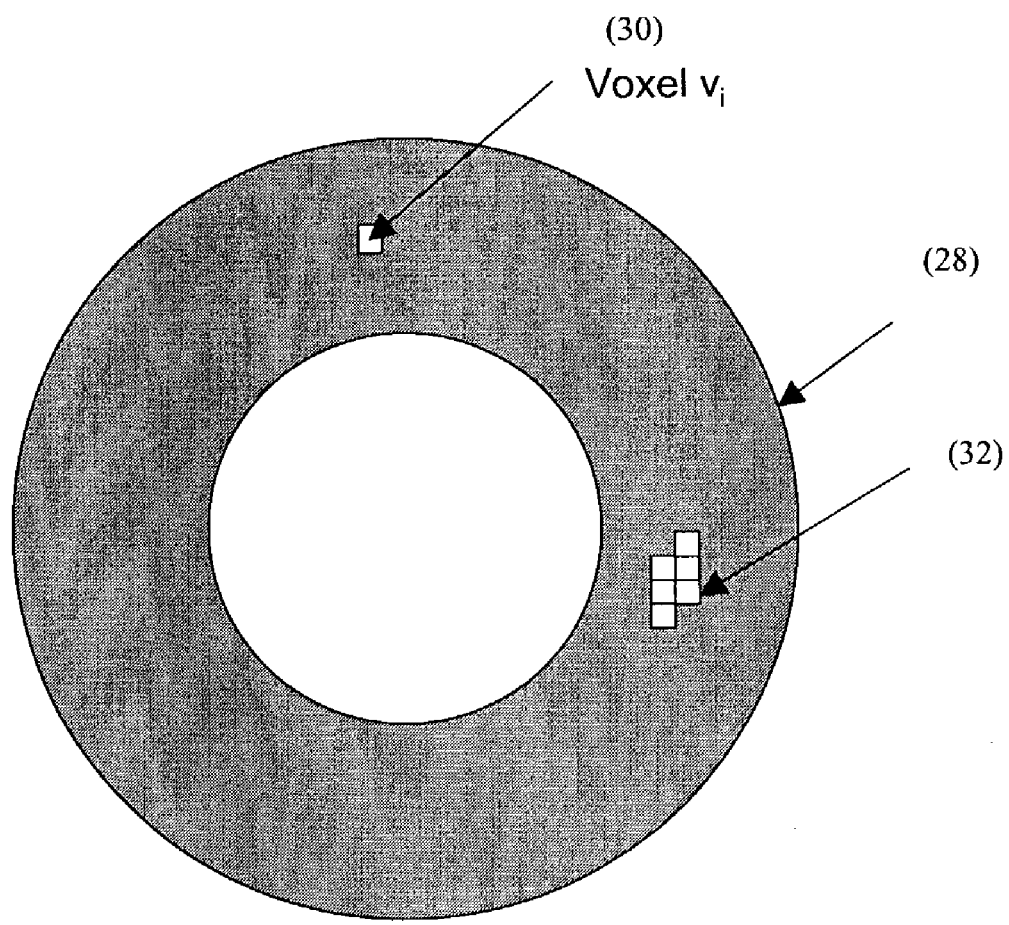
FIG. 2 provides a schematic of a typical sampled image of a downhole packer element.

To illustrate, FIG. 2 provides a schematic of a typical sampled image of a downhole packer element (28). The image represents a slice of the packer element (28). The CT system scans the entire slice and digitally records the attenuation factor ($\gamma_i$), or density, for each of its small volume units ($v_i$) (30), called voxels, or volumetric pixels. As will be discussed below, the CT system can additionally be used to record contiguous voxels (32) having densities falling below a pre-determined threshold.

Attenuation factors are measured and recorded in Hounsfield units (H.U.). Typical values are shown in the following table.

TABLE I

Typical Attenuation Factors (H.U.)

| Media | H.U. |
|---|---|
| Bera Sandstone | 1550 |
| Fiberglass | 870 |
| Bone | 860 |
| Elastomer | 230 to 250 |
| Water | 0 |
| Air | −1000 |

The X-ray attenuation factor for the downhole component is determined experimentally with calibration samples, called phantoms, that are made under controlled conditions using materials and processes that accurately represent the final desired product's X-ray attenuation.

Figure 3:
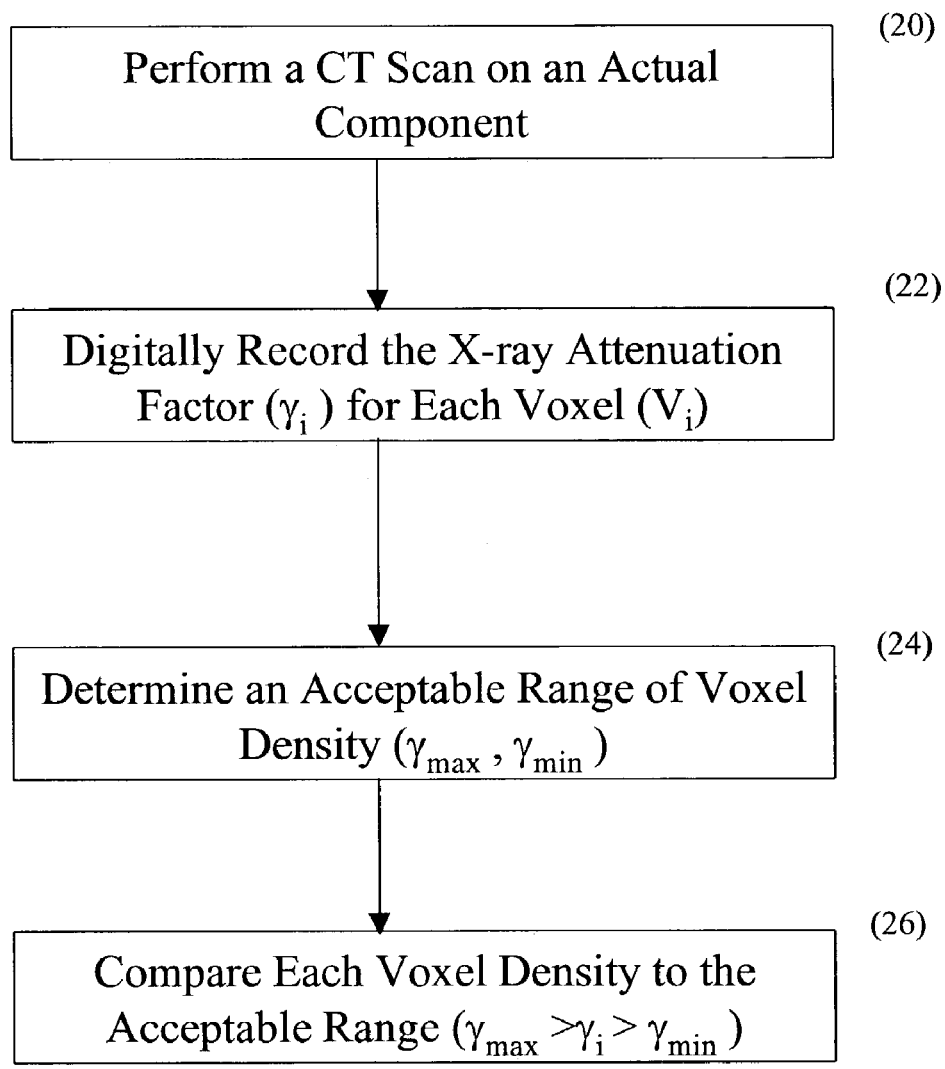
FIG. 3 illustrates an embodiment of the present invention providing a non-destructive CT method of detecting intrinsic density defects in downhole equipment.

One embodiment of the present invention provides a non-destructive CT method (18) of measuring intrinsic density defects in downhole equipment, as described with reference to FIG. 3. In this embodiment, the method (18) is adapted to determine local densities falling outside of an acceptable range for the particular material being analyzed.

In this embodiment, the CT scan is first performed on a downhole component (20). The attenuation factor ($\gamma_i$), or density, for each voxel ($v_i$) is then digitally recorded (22). An acceptable range of voxel density ($\gamma_{max}$, $\gamma_{min}$) is then determined (24). Typically, the acceptable range is determined experimentally based on the downhole component's specific design parameters and selected material. Finally, the density ($\gamma_i$) of each voxel ($v_i$) is compared to the acceptable range (26) per Equation 1 below.

$$\gamma_{max} > \gamma_i > \gamma_{min} \quad \text{(Eq. 1)}$$

As stated in Eq. 1, for the component to be acceptable, each and every voxel ($v_i$) in the component must have a density ($\gamma_i$) falling within the acceptable range. If the density ($\gamma_i$) of any one voxel ($v_i$) falls outside of the acceptable range, the component is rejected.

Figure 4:
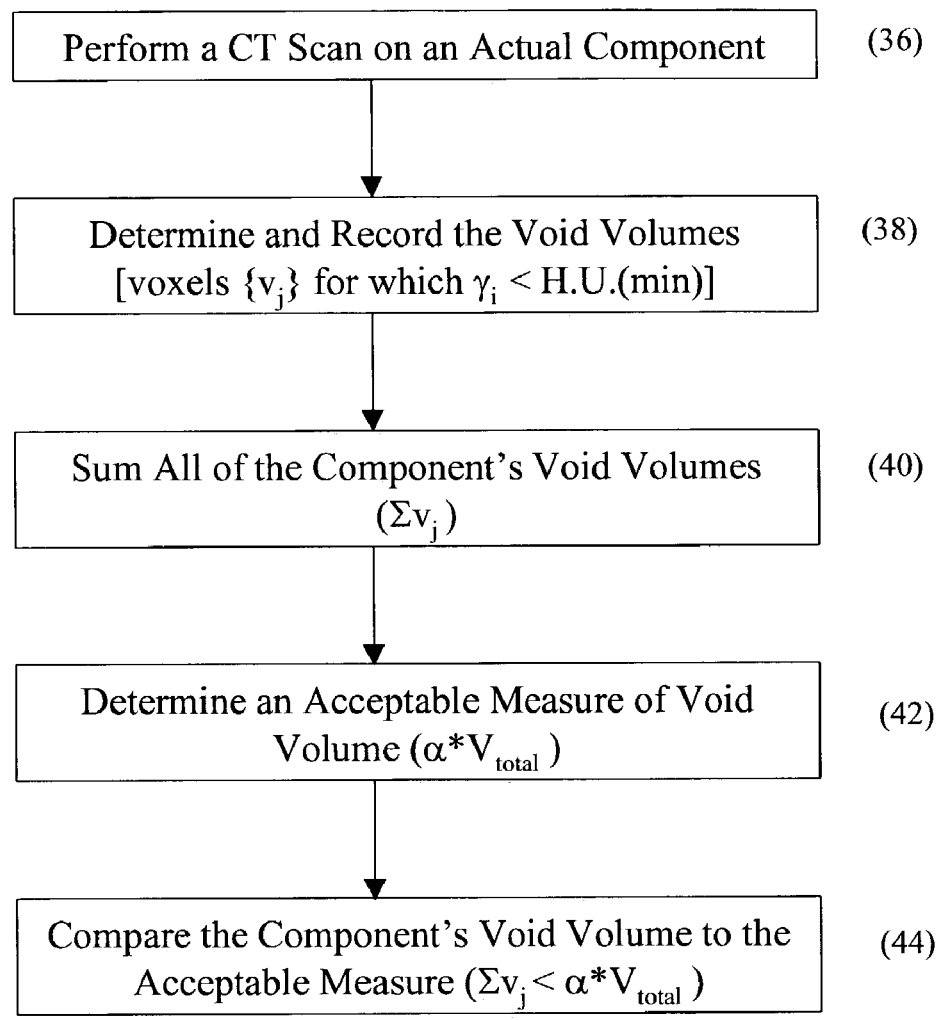
FIG. 4 illustrates an embodiment of the present invention providing a non-destructive CT method of detecting intrinsic void defects in downhole equipment.

Another embodiment of the present invention provides a non-destructive CT method (34) of measuring intrinsic void defects in downhole equipment, as described with reference to FIG. 4. In this embodiment, the method (34) is adapted to determine volumes of local densities falling outside of an acceptable range for the particular material being analyzed.

In this embodiment, the CT scan is first performed on an actual downhole component (36). Next, the void volumes within the downhole component are determined and digitally recorded (38). The void volumes are typically defined as those voxels ($v_j$) for which the voxel density ($\gamma_i$) is less than a specified H.U. threshold (H.U.$_{min}$). It should be understood that the term "void volume" does not necessarily relate to the absence of volume. It is more aptly defined as volumes falling below an acceptable range of H.U. units.

After identifying the void volumes, the set of all voxels ($v_j$) within the downhole component having a void volume are summed (40) and an acceptable void volume is determined (42). In one embodiment, the acceptable void volume is determined by multiplying a void fraction ($\alpha$) by the total volume ($V_{total}$) of the inspected component. The void fraction ($\alpha$) represents a percentage of the total volume ($V_{total}$) of the component that is acceptable without compromising the quality of the component. A typical value for the void fraction ($\alpha$) might be 3%, for example.

After determining the acceptable void volume (42), the sum of the void volumes are compared to the acceptable void volume (44) per Equation 2 below.

$$\Sigma v_j < \alpha * V_{total} \quad \text{(Eq. 2)}$$

As stated in Eq. 2, for the component to be acceptable, the sum of the void voxels ($v_j$) must be less than the total acceptable void volume. If the sum of the void voxels ($v_j$) exceeds the total acceptable void volume, the component is rejected.

Figure 5:
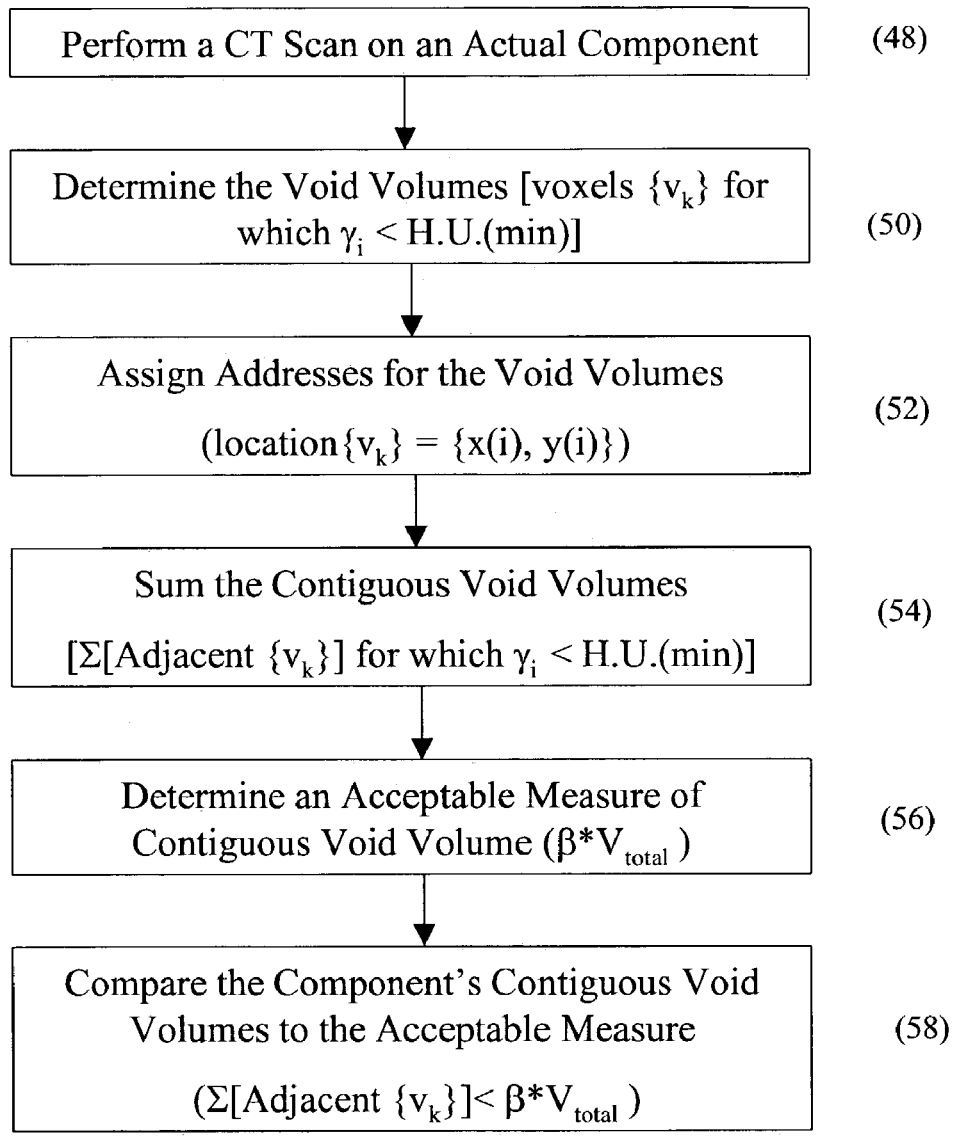
FIG. 5 illustrates an embodiment of the present invention providing a non-destructive CT method of detecting contiguous intrinsic void defects in downhole equipment.

Another embodiment of the present invention provides a non-destructive CT method (46) of measuring contiguous intrinsic void defects in downhole equipment, as described with reference to FIG. 5. In this embodiment, the CT scan is once again performed on an actual downhole component (48). The void volumes within the downhole component are then determined and digitally recorded (50). As discussed above, the void volumes are typically defined as those voxels ($v_k$) for which the voxel density ($\gamma_i$) is less than a predetermined H.U. threshold (H.U.$_{min}$)

In this embodiment, unique addresses are assigned for each of the void volumes (52). For example, in an x-y coordinate system, the location of a specific voxel ($v_k$) in the particular scanned slice is denoted as location $\{v_k\}=\{x(i), y(i)\}$. Using the unique addresses, all of the adjacent void volumes are summed ($\Sigma$[Adjacent $\{v_k\}$) (54). After summing the contiguous void volumes, an acceptable contiguous void volume is determined (56). In one embodiment, the acceptable contiguous void volume is determined by multiplying a contiguous void fraction ($\beta$) by the total volume ($V_{total}$) of the inspected component. The contiguous void fraction ($\beta$) represents a percentage of the total volume ($V_{total}$) of the component that is acceptable without compromising the quality of the component. A typical value for the contiguous void fraction ($\beta$) might be 1%, for example.

After determining the acceptable contiguous void volume (56), the sum of each contiguous void volume is compared to the acceptable void volume (58) per Equation 3 below.

$$\Sigma[\text{Adjacent } \{v_k\}] < \beta * V_{total} \quad \text{(Eq. 3)}$$

As stated in Eq. 3, for the component to be acceptable, the sum of each set of contiguous void voxels $\{v_k\}$ must be less than the total acceptable contiguous void volume. If the sum of the set of contiguous void voxels $\{v_k\}$ exceeds the total acceptable contiguous void volume, the component is rejected.

Figure 6:
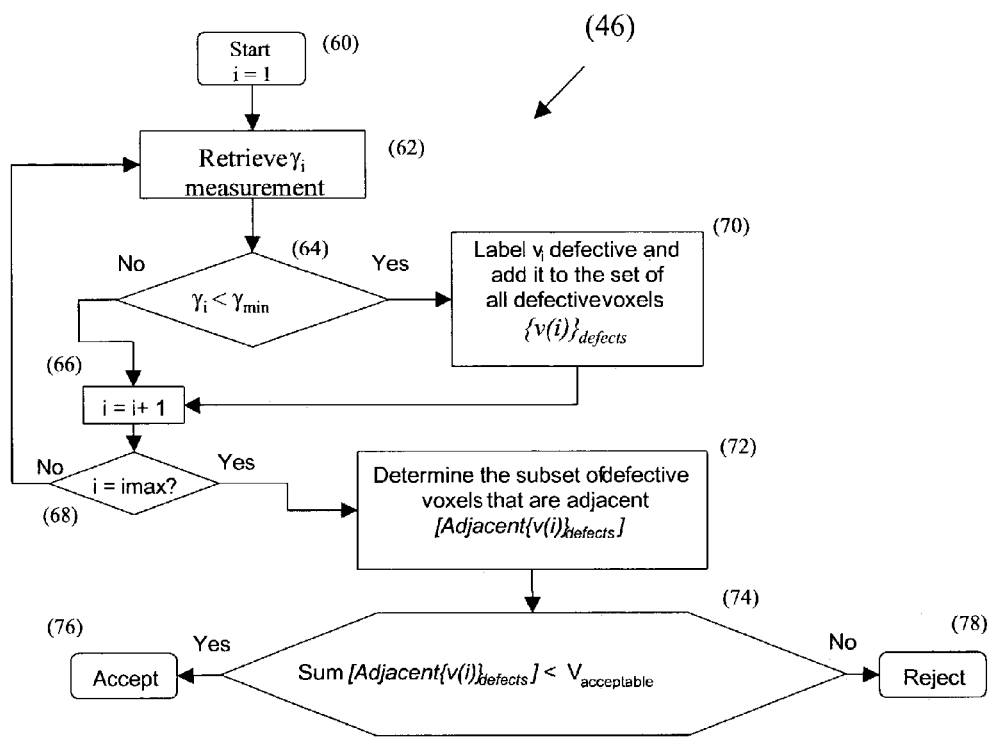
FIG. 6 provides a flow chart of an embodiment of the algorithm used in the present invention to provide a non-destructive CT method of detecting contiguous intrinsic void defects in downhole equipment.

FIG. 6 provides a flow chart illustration of an embodiment of the above described algorithm for measuring contiguous intrinsic void defects in downhole equipment. The counter is first set to (i=1) (60) and the density measurement ($\gamma_i$) for the first voxel (v(i)) is retrieved (62). If the density measurement ($\gamma_i$) is greater than the H.U. threshold ($\gamma_{min}$) than the counter is increased by 1 (i=i+1) (66) and the new counter is checked against the maximum counter value (imax) (68). The maximum counter value is set according to the total number of voxels ($v_i$) existing within the slice. If the maximum counter value has not yet been reached, the next voxel ($v_{i+1}$) is analyzed.

If, for a particular voxel ($v_i$) the density measurement ($\gamma_i$) is less than the H.U. threshold, the voxel ($v_i$) is labeled as defective and added to the set of all defective voxels [$(v_i)_{defects}$] (70). The counter is then increased by one (i=i+1) (66) and the next voxel $v_{i+1}$ is analyzed.

Once the maximum counter value (imax) has been reached, the subset of defective voxels that are adjacent is determined [Adjacent $(v_i)_{defects}$] (72). As described above, each defective voxel is given a unique address for the purpose of determining those that are adjacent. Each subset of adjacent defective voxels are then summed and compared to an acceptable contiguous void volume [Sum (Adjacent$\{v_i\}_{defects}$)<$V_{acceptable}$] (74). Those components that have contiguous defective voxels less than the acceptable measure are accepted (76) and those that have contiguous defective voxels greater than the acceptable measure are rejected (78).

Figure 7:
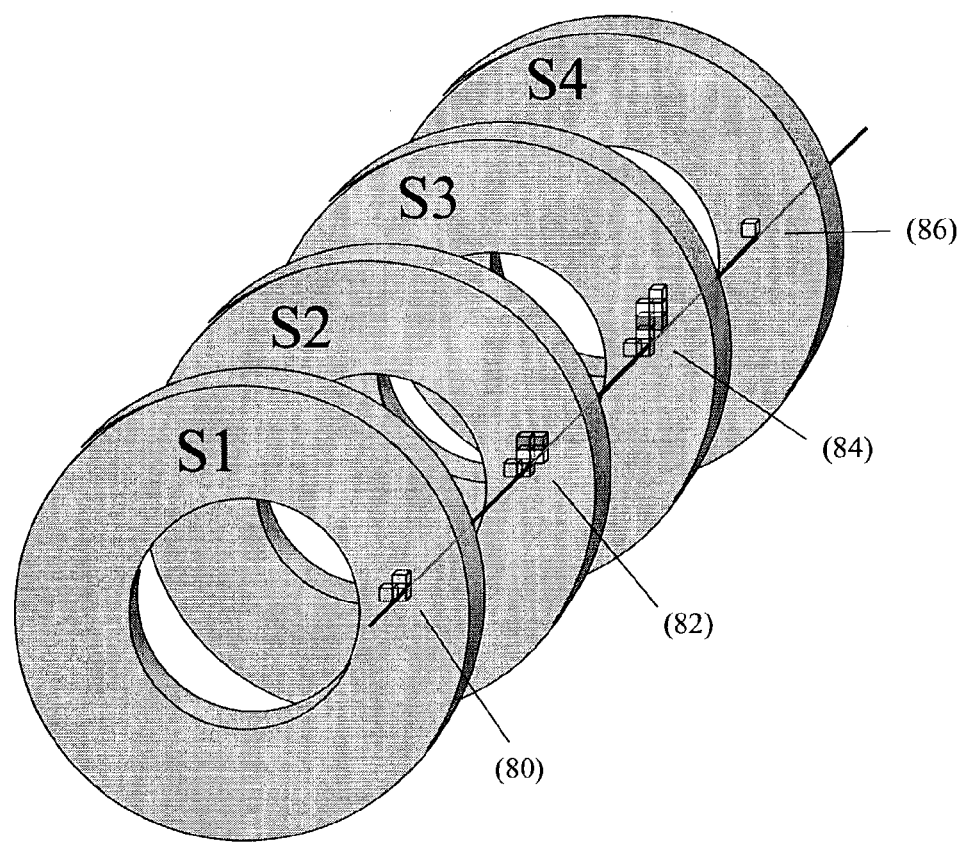
FIG. 7 illustrates multiple slices of a downhole component having contiguous voids, both within the same slice and across multiple slices.

Another embodiment of the present invention provides a non-destructive CT method of measuring cross-slice contiguous intrinsic void defects in downhole equipment. This method enables detection and analysis of voids that are contiguous across different slices of the component. As illustrated in FIG. 7, multiple slices S1, S2, S3, and S4 may have voids (80), (82), (84), (86) that are contiguous to voids within the same slice or contiguous to voids across one or more slices.

To account for the cross-slice contiguous voids, each void voxel ($v_i$) is given a unique address that locates its position within the particular slice. For example, in an x-y coordinate system, the location of a specific voxel in slice S1 is denoted as [location $\{S1,v_i\}=\{x(1,i), y(1,i)\}$]. Likewise, the location of a specific voxel in slice S2 is denoted as [location $\{S2,v_i\}=\{x(2,i), y(2,i)\}$].

For the purpose of analysis, in one embodiment it is assumed that the dimensions of the voxel are normalized so that each voxel is one unit long in either the (x) or (y) directions. Within each slice, two voxels are considered adjacent if their locations are within one absolute unit of distance in either the (x) or (y) direction. Similarly, two voxels [$v_i$ and $v_j$] in two adjacent slices (k and k+1), are adjacent if their (x) and (y) coordinates are within one unit distance in either the (x) or (y) direction.

The methodology of analyzing contiguous intrinsic void defects across multiple slices is similar to that described above with reference to analyzing a single slice. The only difference being that the unique cross-slice addresses enable identification and measurement of voids spanning adjacent slices.

Figure 8:
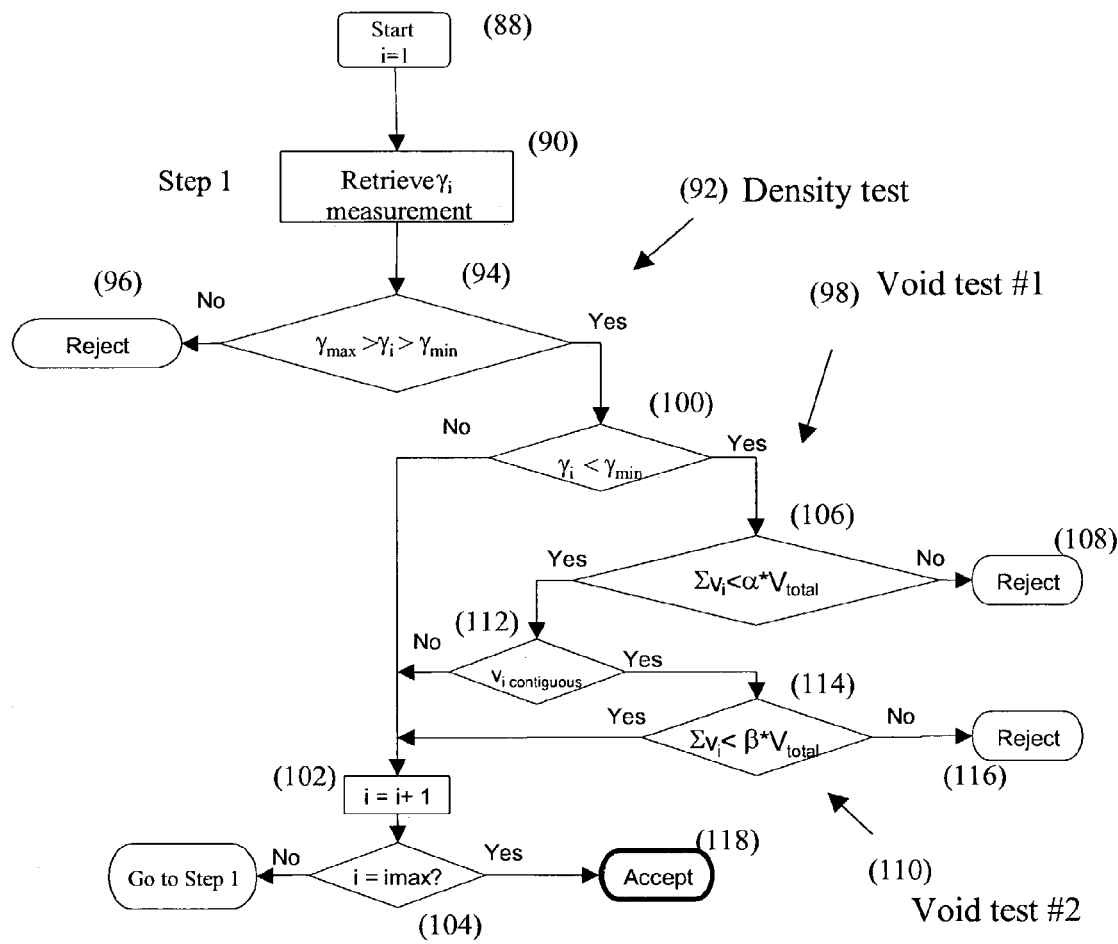
FIG. 8 provides a flow chart illustrating an embodiment of the present invention adapted to detect both intrinsic and extrinsic defects in downhole components.

It should be understood that the various described embodiments of the present invention are not mutually exclusive to each other. In other words, the various non-destructive CT methods of detecting intrinsic and extrinsic defects in downhole equipment can be combined in any number of ways. By way of example, FIG. 8 provides a flow chart illustration of an embodiment of the present invention that employs non-destructive CT methods of measuring various intrinsic defects in downhole equipment.

In this embodiment, the counter is first set to (i=1) (88) and the density measurement ($\gamma_i$) for the first scanned voxel ($v_i$) is retrieved (90). A density test (92) is then performed on the voxel ($v_i$). The density test is adapted to determine local densities falling outside of an acceptable range for the particular material being analyzed. The density measurement ($\gamma_i$) is compared with a density range ($\gamma_{max}$, $\gamma_{min}$) (94). If the density measurement ($\gamma_i$) is outside the acceptable range, then the downhole component is rejected (96).

If the density measurement ($\gamma_i$) falls within the acceptable range, then the first void test (98) is initiated. The first void test (98) is adapted to determine volumes of local densities falling outside of an acceptable range for the particular material being analyzed.

The density ($\gamma_i$) for the voxel ($v_i$) is first compared to the H.U. threshold ($\gamma_{min}$) (100). If the voxel density ($\gamma_i$) is greater than the H.U. threshold ($\gamma_{min}$) than the counter is increased by 1 (i=i+1) (102) and the new counter is checked against the maximum counter value (imax) (104). The maximum counter value is set according to the total number of voxels ($v_i$) existing within the slice. If the maximum counter value (imax) has not yet been reached, the next voxel ($v_{i+1}$) is analyzed beginning once again with the density test (92).

If, for a particular voxel ($v_i$) the density measurement ($\gamma_i$) is less than the H.U. threshold ($\gamma_i$), the voxel ($v_i$) is added to the set of all defective voxels [$(v_i)_{defects}$] and compared to the acceptance criteria ($\alpha*V_{total}$) for the sum of void volumes (106). If the present sum of defective voxels ($\Sigma v_i$) is greater than the acceptance criteria, the component is rejected (108).

If the present sum of defective voxels ($\Sigma v_i$) is less than the acceptance criteria ($\alpha*V_{total}$), the second void test (110) is initiated. (Note that in this embodiment, the $1^{st}$ and $2^{nd}$ void test are performed concurrently). The second void test (110) is adapted to detect contiguous sets of void volumes. The first step of the second void test (110) is to determine if the void volume associated with the presently examined voxel ($v_i$) is contiguous with another void volume (112). If the void volume is not contiguous with another void volume, the counter is increased by one (i=i+1) (102) and the next voxel ($v_{i+1}$) is analyzed beginning with the density test (92).

If the void volume is contiguous with another void volume, the sum of this particular set of contiguous voxels ($v_i$) having void volumes [$\Sigma$[Adjacent $\{v_i\}$] is compared to the acceptance criteria ($\beta*V_{total}$) (114). If the sum [$\Sigma$[Adjacent $\{v_i\}$] is greater than the acceptance criteria ($\beta*V_{total}$), the component is rejected (116). If the sum [$\Sigma$[Adjacent $\{v_i\}$] is less than the acceptance criteria ($\beta*V_{total}$), the counter is increased by one (i=i+1) and the next voxel ($v_{i+1}$) is analyzed beginning with the density test (92). The iterative process is repeated until the maximum counter value (imax) has been reached. Once the maximum counter value (imax) has been reached, if the component has not already been rejected by one of the three tests (92), (98), (110), the component is accepted (118).

Although described primarily with reference to packer elements, it should be understood that the present invention has applicability for any number of downhole tools and equipment. For example, the present invention can be used to detect defects in downhole elastomeric components useful in downhole elements such as valve seals, tubular seals, O-rings, protector elements in electrical submersible pumps, electrical insulators, electrical connectors, fiber optic cable, fiber optic connections, ram blowout preventers, mud pump pistons, drill motors, well head seals, cable jackets, drilling hoses, pressure accumulators, wipers, swab cups, pump stators, bonded seals, and drill pipe protectors, for example. Similarly, the present invention has applicability for testing downhole perforating guns, explosives, and shaped charge, where presently inspection is performed through destructive sample testing.

The invention being thus described, it will be obvious that the same may be varied in many ways. Such variations are not to be regarded as a departure from the spirit and scope of the invention, and all such are intended to be included within the scope of the following non-limiting claims.

What is claimed is:

1. A non-destructive CT method of detecting extrinsic defects in downhole equipment, comprising:
    creating a digital image of a plurality of components of the ideal downhole equipment;
    determining acceptance criteria for one or more properties of at least one interface between components of the plurality of components on the digital image;
    using a Computed Tomography (CT) scanner to create a digital image that includes an interface between a plurality of components of the actual downhole equipment; and
    comparing the digital image of the plurality of components of the actual downhole equipment to the acceptance criteria for the one or more components of the ideal downhole equipment to determine whether the interface is acceptable.

2. The non-destructive CT method of claim 1, further comprising detecting defects selected from de-bonds, geometric irregularities, and irregularities in component interfaces.

3. The non-destructive CT method of claim 1, wherein the downhole equipment comprises a downhole packer.

4. The non-destructive CT method of claim 1, wherein the plurality of downhole components are selected from packer sealing elements, valve seals, tubular seals, O-rings, protector elements in electrical submersible pumps, electrical insulators, electrical connectors, fiber optic cable, fiber optic connections, ram blowout preventers, mud pump pistons, drill motors, well head seals, cable jackets, drilling hoses, pressure accumulators, wipers, swab cups, pump stators, bonded seals, and drill pipe protectors.

5. The non-destructive CT method of claim 1, wherein the downhole equipment comprises a downhole shaped charge.

6. The non-destructive CT method of claim 1, wherein the downhole equipment comprises a downhole perforating gun.

7. The non-destructive CT method of claim 1, further comprising forming the plurality of components from materials selected from rubber, elastomers, fiber reinforced composites, fiberglass, metal, polymers, and ceramics.

8. The non-destructive CT method of claim 1, further comprising defining the plurality of components of the ideal downhole equipment by CAD files.

9. The non-destructive CT method of claim 1, further comprising creating the plurality of components of the ideal downhole equipment from calibration samples.

10. The non-destructive CT method of claim 1, wherein the acceptance criteria includes max/min tolerances for the one or more properties of the one or more components of the ideal downhole equipment.

11. The non-destructive CT method of claim 1, wherein the one or more properties of the plurality of components of the ideal downhole equipment are selected from geometric dimensions and component interfaces.

12. The non-destructive CT method of claim 1, wherein the CT scanner uses X-rays.

13. The non-destructive CT method of claim 1, wherein the CT scanner uses neutron imaging rays.

14. The non-destructive CT method of claim 1, wherein the CT scanner creates a 2-D image.

15. The non-destructive CT method of claim 1, wherein the CT scanner creates a 3-D image.

16. The non-destructive CT method of claim 1, wherein the comparing of the image is performed through edge detection techniques.

17. A non-destructive CT method of measuring intrinsic density defects in a downhole component, comprising:
    performing a CT scan on the downhole component to evaluate densities of a plurality of voxels in the downhole component;
    utilizing data from the CT scan to determine the densities of the plurality of voxels;
    recording the density for each voxel in the component;
    determining an acceptable range for the density values existing in the downhole component; and
    comparing the density values to the acceptable range to determine whether the downhole component is acceptable for use in a downhole environment.

18. The non-destructive CT method of claim 17, adapted to detect defects selected from density irregularities.

19. The non-destructive CT method of claim 17, wherein the downhole equipment is a packer.

20. The non-destructive CT method of claim 17, wherein the downhole component comprises a sealing element.

21. The non-destructive CT method of claim 17, wherein the downhole component comprises materials selected from rubber, elastomers, fiber reinforced composites, fiberglass, metal, polymeric, and ceramics.

22. The non-destructive CT method of claim 17, wherein the downhole component is selected from valve seals, tubular seals, O-rings, protector elements in electrical submersible pumps, electrical insulators, cable connectors, fiber optic cable, fiber optic connections, ram blowout preventers, mud pump pistons, drill motors, well head seals, cable jackets, drilling hoses, pressure accumulators, wipers, swab cups, pump stators, bonded seals, and drill pipe protectors.

23. The non-destructive CT method of claim 17, wherein the downhole equipment is a downhole shaped charge.

24. The non-destructive CT method of claim 17, wherein the downhole equipment is a downhole perforating gun.

25. The non-destructive method of claim 17, wherein the CT scanner uses X-rays.

26. The non-destructive method of claim 17, wherein the CT scanner uses neutron imaging rays.

27. A non-destructive CT method of measuring intrinsic void defects in a downhole component, comprising:
    performing a CT scan on the downhole component to evaluate densities of a plurality of voxels in the downhole component;
    utilizing data from the CT scan to determine the densities of the plurality of voxels;
    recording the voxels, of the plurality of voxels, having densities below a pre-determined threshold;
    summing the recorded voxels;
    determining an acceptable measure of void volume existing in the downhole component; and comparing the summation of the recorded voxels to the acceptable measure.

28. The non-destructive CT method of claim 27, adapted to detect defects selected from de-laminations and density irregularities.

29. The non-destructive CT method of claim 27, wherein the downhole equipment is a packer.

30. The non-destructive CT method of claim 27, wherein the downhole component comprises a sealing element.

31. The non-destructive CT method of claim 27, wherein the downhole component comprises materials selected from rubber, elastomers, fiber reinforced composites, fiberglass, metal, polymeric, and ceramics.

32. The non-destructive CT method of claim 27, wherein the downhole component is selected from valve seals, tubular seals, O-rings, protector elements in electrical submersible pumps, electrical cable, electrical connectors, electrical insulators, fiber optic cable, fiber optic connections, ram blowout preventers, mud pump pistons, drill motors, well head seals, cable jackets, drilling hoses, pressure accumulators, wipers, swab cuts, pump stators, bonded seals, and drill pipe protectors.

33. The non-destructive CT method of claim 27, wherein the downhole equipment is a downhole shaped charge.

34. The non-destructive CT method of claim 27, wherein the downhole equipment is a downhole perforating gun.

35. The non-destructive method of claim 27, wherein the CT scanner uses X-rays.

36. The non-destructive method of claim 27, wherein the CT scanner uses neutron imaging rays.

37. A non-destructive CT method of measuring contiguous intrinsic void defects in a downhole component, comprising:
   performing a CT scan on the downhole component to evaluate densities of a plurality of voxels in the downhole component;
   utilizing data from the CT scan to determine the densities of the plurality of voxels;
   recording the voxels, of the plurality of voxels, having densities below a pre-determined threshold;
   assigning unique addresses for the recorded voxels;
   summing the contiguous recorded voxels;
   determining an acceptable measure of contiguous void volume existing in the downhole component; and
   comparing the summation of the recorded contiguous voxels to the acceptable measure.

38. The non-destructive CT method of claim 37, adapted to detect defects selected from de-laminations and density irregularities.

39. The non-destructive CT method of claim 37, further adapted to measure defects across multiple CT scan slices.

40. The non-destructive CT method of claim 37, wherein the downhole equipment is a packer.

41. The non-destructive CT method of claim 37, wherein the downhole component comprises a sealing element.

42. The non-destructive CT method of claim 37, wherein the downhole component comprises materials selected from rubber, elastomers, fiber reinforced composites, fiberglass, metal, polymeric, and ceramics.

43. The non-destructive CT method of claim 37, wherein the downhole component is selected from valve seals, tubular seals, O-rings, protector elements in electrical submersible pumps, electrical cable, electrical connectors, electrical insulators, fiber optic cable, fiber optic connections, ram blowout preventers, mud pump pistons, drill motors, well head seals, cable jackets, drilling hoses, pressure accumulators, wipers, swab cuts, pump stators, bonded seals, and drill pipe protectors.

44. The non-destructive CT method of claim 37, wherein the downhole equipment is a downhole shaped charge.

45. The non-destructive CT method of claim 37, wherein the downhole equipment is a downhole perforating gun.

46. The non-destructive method of claim 37, wherein the CT scanner uses X-rays.

47. The non-destructive method of claim 37, wherein the CT scanner uses neutron imaging rays.

48. A non-destructive method of determining the quality of downhole components, comprising:
   performing a CT scan on the downhole components to evaluate densities of a plurality of voxels in the downhole component;
   utilizing data from the CT scan to determine the densities of the plurality of voxels;
   performing a density test for each voxel;
   performing a void volume test for each voxel having a density with an range;
   performing a contiguous void volume test for each voxel when a sum of defective voxels is less than an acceptance criteria; and
   determining whether a downhole component is to be rejected based on the number of defective voxels.

* * * * *